United States Patent [19]

Swozil

[11] 4,425,820

[45] Jan. 17, 1984

[54] CONNECTING ROD OF A COMPOSITE MATERIAL AND METHOD FOR MANUFACTURING THE SAME

[75] Inventor: Adolf Swozil, Kühlenthal, Fed. Rep. of Germany

[73] Assignee: Sigri Elektrographit GmbH, Meitingen bei Augsburg, Fed. Rep. of Germany

[21] Appl. No.: 231,008

[22] Filed: Feb. 3, 1981

[30] Foreign Application Priority Data

Feb. 8, 1980 [DE] Fed. Rep. of Germany ....... 3004575

[51] Int. Cl.³ .............................................. G05G 1/00
[52] U.S. Cl. ............................. 74/579 R; 74/579 E
[58] Field of Search .......................... 74/579 R, 579 E

[56] References Cited

U.S. PATENT DOCUMENTS 2,733,782 2/1956 Bachman .............................. 74/579
3,434,372 3/1969 Delker .................................. 74/579

FOREIGN PATENT DOCUMENTS 567369 12/1923 France .............................. 74/579 E Primary Examiner—Kenneth Dorner
Attorney, Agent, or Firm—Herbert L. Lerner; Laurence A. Greenberg

[57] ABSTRACT

Connecting rod of a composite material formed from reinforcement fibers wound in the form of an endless loop with constant cross-sectional shape and the fiber bundle enclosed by a jacket of aluminum.

5 Claims, 4 Drawing Figures

CONNECTING ROD OF A COMPOSITE MATERIAL AND METHOD FOR MANUFACTURING THE SAME

BACKGROUND OF THE INVENTION

1. Field of the Invention

The invention relates to a connecting rod, and more particularly refers to a new and improved connecting rod of a composite material formed from reinforced fibers with constant cross sectional area and variable cross sectional shape and method of making same.

2. Description of the Prior Art

Fiber reinforced parts have been proposed for various applications because of the favorable ratio of strength and modulus of elasticity to the mass of the part. A particularly advantageous ratio is obtained especially if a synthetic resin matrix is used. However, its use often exhibits a relatively less favorable resistance to corrosive substances and insufficient hardness. The limitations also apply to connecting rods of composite materials with a synthetic resin matrix which is subjected to hot oils, oil vapors and oil alloy substances. The effect of these substances leads, among other things, to a reduction of the fatigue strength.

To protect the surface of bodies of a composite material with a simple cross-sectional shape, it is known, for instance, from British Pat. No. 1,515,104 to provide the bodies with nickel plating. Because of the complex shape and the magnitude of the alternating stresses applied to the part, such platings are less suitable for connecting rods.

SUMMARY OF THE INVENTION

An object of the invention is to provide a connecting rod of a composite material, which, with resistance to aggressive substances comparable to metals exhibits better fatigue strength and an advantageous strength-to-mass ratio.

With the foregoing and other objects in view, there is provided in accordance with the invention a connecting rod of a composite material formed from reinforcement fibers wound in the form of an endless loop with constant cross-sectional area and varying cross-sectional shape, and the fiber bundle enclosed by a jacket of aluminum.

In accordance with the invention, there is provided a method for manufacturing a connecting rod comprising winding reinforcement fibers coated with a hardening synthetic resin on a winding core, pressing the winding core to bring it into a shape corresponding to the cross-sectional shape of the connecting rod, setting said synthetic resin, placing the molded part after the resin component has set, into a multi-part aluminum mold with close fit, cementing said mold part to the mold; and connecting the parts of the mold to make a liquid-tight jacket enclosing the molded part.

Other features which are considered as characteristic for the invention are set forth in the appended claims.

Although the invention is illustrated and described herein as embodied in a connecting rod of a composite material and method for manufacturing the same, it is nevertheless not intended to be limited to the details shown, since various modifications may be made therein without departing from the spirit of the invention and within the scope and range of equivalents of the claims.

BRIEF DESCRIPTION OF THE DRAWINGS

The invention, however, together with additional objects and advantages thereof will be best understood from the following description when read in connection with the accompanying drawings in which.

DETAILED DESCRIPTION OF THE INVENTION

Figure 1:
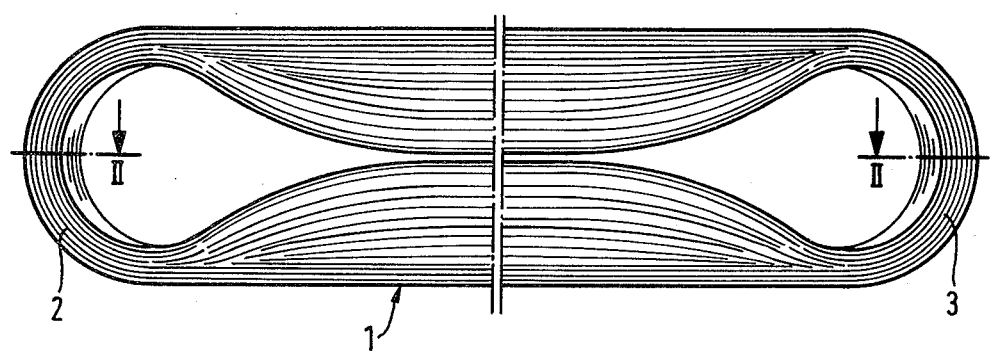
FIG. 1 shows a top view onto a wound body of reinforcement fibers in the form of an endless loop.

In accordance with the invention, in the connecting rod reinforcement fibers are wound in the form of an endless loop and the fiber bundle is enclosed in a jacket of aluminum.

In the connecting rod, according to the invention, the aluminum jacket shields the surface of the composite material against oil and oil vapors and, if the connecting rod is warmed up to the operating temperature, compression stresses are generated in the jacket and tensile stresses in the composite material because of the different thermal coefficients of expansion of the metal jacket and the composite material which is enclosed by the jacket and is connected thereto in a positive manner. These stresses provide a mechanical stress of the metal and the composite material commensurate with the material and therefore, high fatigue strength of the part. Also the mass of the connecting rod is only 40 to 60% of a corresponding rod of metal, so that the inertial forces in a connecting rod according to the invention are substantially smaller than in the known designs.

According to one preferred embodiment of the invention, the connecting rod is designed in two parts. In this embodiment, a main part comprising the eye of the connecting rod, the shank of the connecting rod and part of the connecting rod head is wound from reinforcement fibers in a form of a double loop which has cutouts in the region of the connecting rod head. The second part of the connecting rod head, which has substantially the form of a half-shell and may likewise consist of a composite material or metal such as aluminum, is connected to the main part of the connecting rod by means of expansion bolts which are arranged in the cutouts of the composite body. Particularly well suited as the reinforcement fibers for the connecting rod according to the invention are in paricular carbon fibers which exhibit relatively high strength and a large modulus of elasticity. The term carbon fibers is understood to include graphite fibers. According to another embodiment, the radially inner fibers have a smaller modulus of elasticity than the outer fibers. In that case, the inner fibers of the fiber bundle are glass fibers and the outer fibers carbon fibers. Epoxy resins are particularly well suited as matrix of the compound material even though also other thermally stressable resins are not excluded, for instance formaldehyde resins or polyimide resins.

The aluminum jacket enclosing the composite material part of the connecting rod has a wall thickness which preferably varies over the length of the connecting rod, the wall thickness being adapted to the actual stress curve. The jacket consists advantageously of several parts which are connected together liquid-tight, preferably of two parts which are connected to each other liquid-tight.

To manufacture a connecting rod according to the invention, reinforcement fibers in the form of filament bundles are moved through a liquid synthetic resin or a synthetic resin solution and are coated in the process with a thin synthetic resin film. The coated fibers are wound as an endless loop on a winding core in known manner and the solvent contained in the resin is removed by slight heating. If a composite material is used which contains several kinds of fibers, the individual fiber types are wound on the arbor successively, for instance first a layer of glass fibers which, after the wound body is formed, forms the inside of the shaped part and then a layer of carbon fibers. The ratio of glass to carbon fibers is generally 1:1 to 1:2. The wound core is then placed in a mold, is densified by pressure and brought into the shape of a connecting rod. In the molded body, the fibers are oriented in line with the stresses and the cross sectional shape of the molded part is adapted to the stresses which vary over the length of the connecting rod. After the resin has set, the molded part is placed with a close fit in an aluminum mold consisting of at least two parts and is connected to the mold in a positively locking manner, for instance by a synthetic resin adhesive. The parts of the aluminum mold are then advantageously connected together in a liquid-tight manner by means of an oil-resistance adhesive with a synthetic resin base, whereby the composite material is encapsulated in jacket-fashion.

Figure 2:
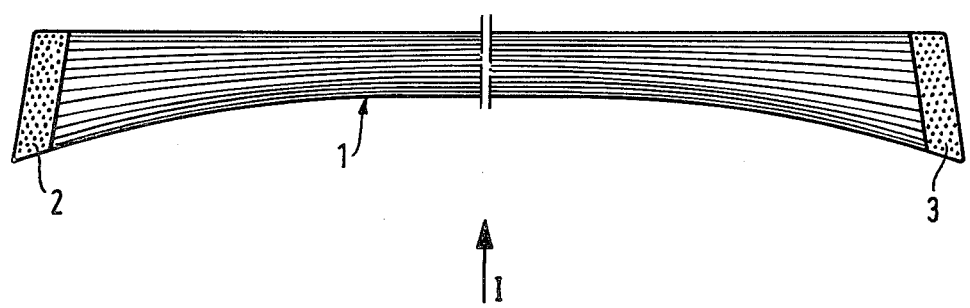
FIG. 2 is a cross section through the wound body taken along the line II—II of FIG. 1.

In the following, the invention will be explained by way of example with the aid of the Figures. FIGS. 1 and 2 show a wound body 1 in the form of an endless loop with the crest zones 2 and 3, which has a constant cross-sectional area and a varying cross-sectional shape. In particular, the width of the longitudinal legs decreases toward the crest zones and according to the reduced width, the thickness of the body in the direction of the crest zones increases. The endless loop which consists of compound fiber material with unidirectional fiber orientation, is brought into the shape of a connecting rod by pressing, as described above, is heated up for hardening the resin matrix, and is encapsulated with a jacket 4 of aluminum.

Figure 3:
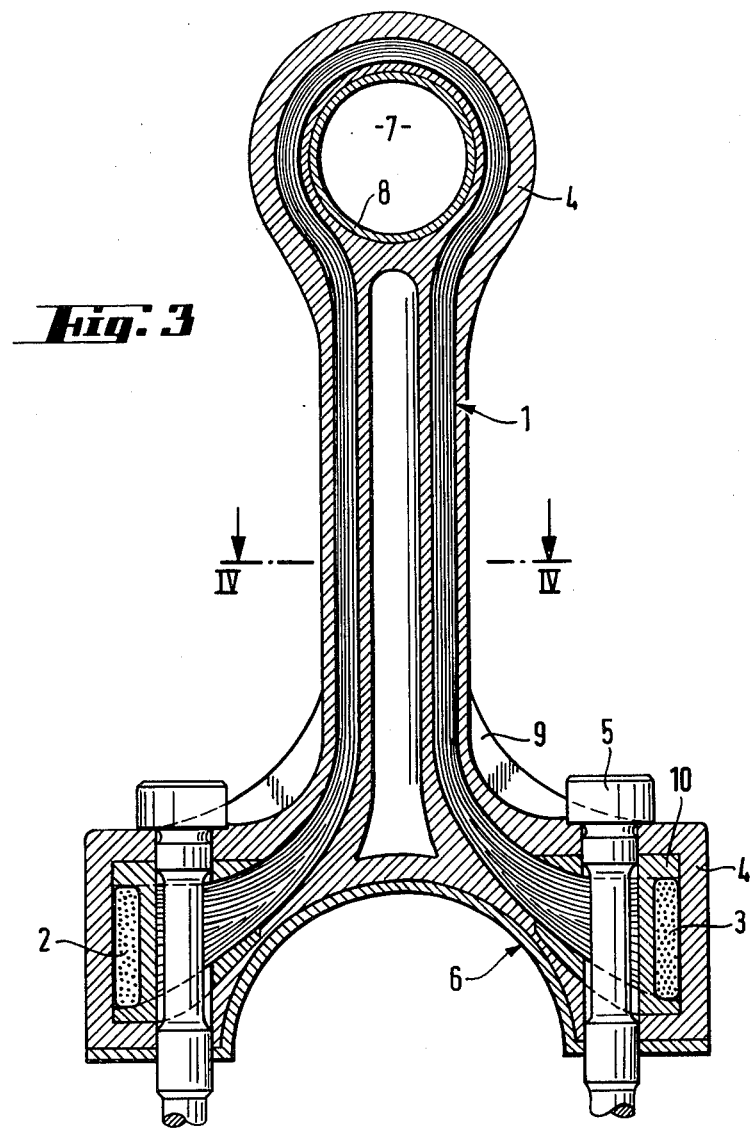
FIG. 3 is a longitudinal section of a connecting rod showing the wound body, the aluminum jacket, the eye of the rod, the bushing, the shank, the head of the rod, two crest zones, expansion volts, and a bearing shell.
Figure 4:
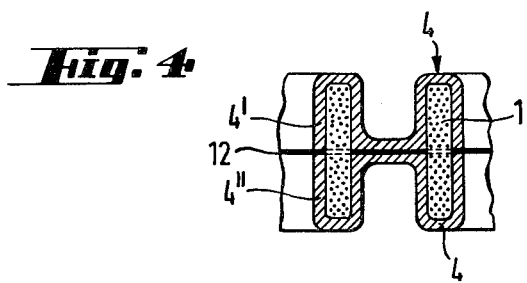
FIG. 4 is a section taken along the line IV—IV in FIG. 3.

FIGS. 3 and 4 show a connecting rod with a formed wound body 1 and a two-part aluminum jacket 4 which encloses the wound body in a liquid-tight manner and has a rib-shaped wider part 9 in the region of the connecting rod head. The loop-shaped crest zones 2, 3 of the wound body are located in the area of the connecting rod head and have cutouts in which the expansion bolts 5 are accommodated. The lower part of the connecting rod head and the connection of the lower part to the main part of the connecting rod are not shown in the drawing. The bearing shell 6 consists of steel or another metal alloy. The filler 10 avoids abrupt cross section changes of the wound body. The eye 7 of the connecting rod is made completely of the encapsulated composite material and has a bearing bushing 8. The two aluminum jacket halves 4' and 4" are connected liquid-tight to each other in the zone 12.

In the composite material core of the connecting rod, the reinforcement fibers run parallel to the stress directions; the thickness of the aluminum jacket 4 corresponds to the magnitude of the stresses applied. The prestresses produced by heating the connecting rod to the operating temperature in the core and in the jacket, finally, have the effect that under the alternating stresses to which a connecting rod is subjected, the composite material core is acted upon exclusively by tensile swell stresses and the aluminum jacket 4 exclusively by compression swell stresses. In the connecting rod according to the invention, the utilization of the material accordingly is very advantageous.

I claim:

1. Connecting rod of composite material formed from reinforcement fiber wound in the form of an endless loop with constant cross-sectional area and varying cross-sectional shape, said endless loop of reinforcement fibers enclosed by a jacket of aluminum, said connecting rod comprising a connecting rod eye, a connecting rod shank and an arc curved part of a connecting rod head in the form of a double loop of reinforcement fibers which has cutouts in the vicinity of the connecting rod head, and wherein said arc curved part is adapted to match a corresponding arc curved part and form a circle with both curved parts forming the circle connected by expansion bolts.

2. Connecting rod according to claim 1, wherein carbon fibers are used as reinforcement fibers.

3. Connecting rod according to claim 1, wherein said wound reinforcement fibers are glass fibers to form an inner layer of glass fibers and thereafter said wound reinforcement fibers are carbon fibers to form an outer layer of carbon fibers.

4. Connecting rod according to claim 1, wherein the aluminum jacket has a wall thickness which varies over the length of the connecting rod.

5. Connecting rod according to claim 1, wherein the aluminum jacket consists of two parts which are connected to each other liquid-tight.

* * * * *